W. H. MINER.
FRICTION DRAFT RIGGING.
APPLICATION FILED JAN. 3, 1910.
966,464.
Patented Aug. 9, 1910.
2 SHEETS—SHEET 1.
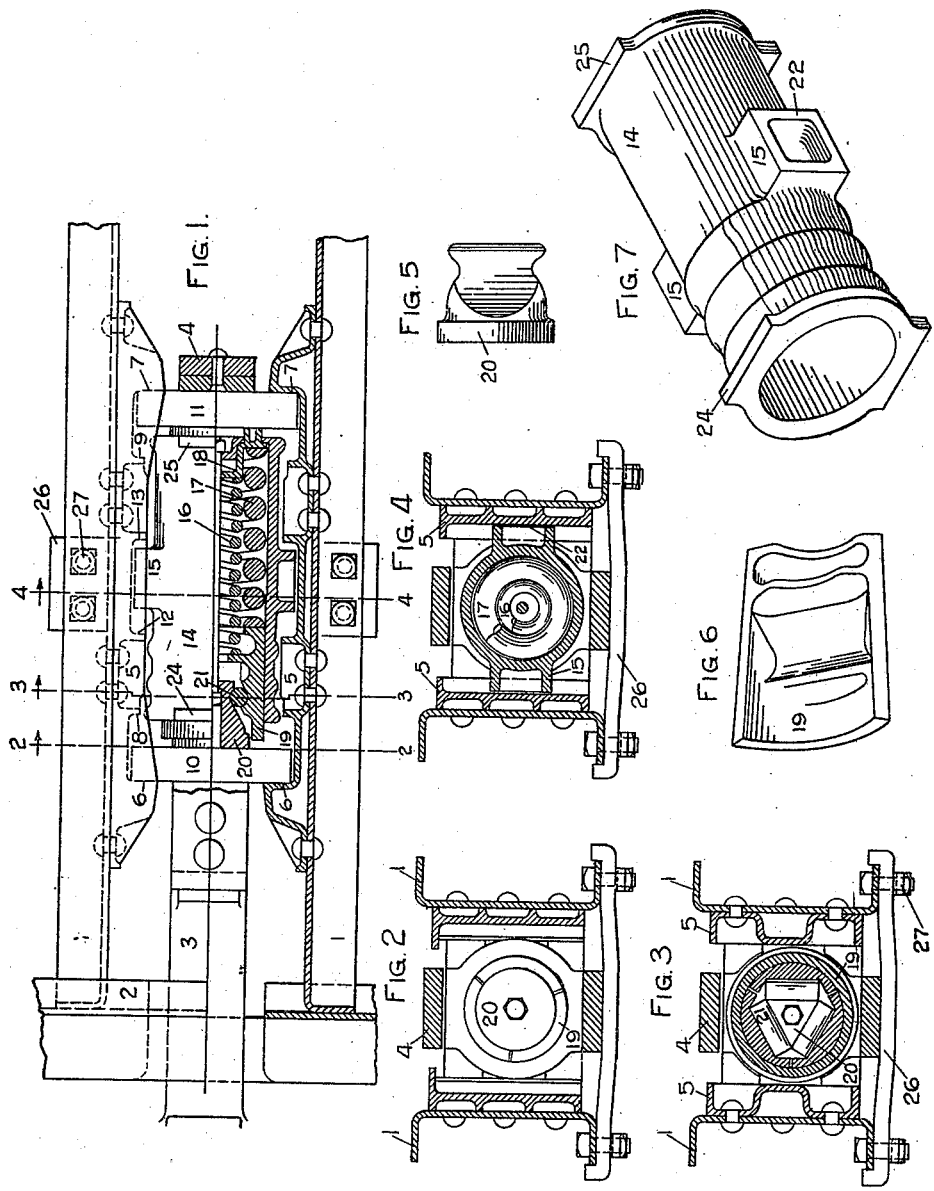
WITNESSES:
Calvin B. Patch.
Pearl Abrams.
INVENTOR
William H. Miner.
BY
Munday Evarts Adcock & Clarke
ATTORNEYS.

W. H. MINER.
FRICTION DRAFT RIGGING.
APPLICATION FILED JAN. 3, 1910.
966,464.
Patented Aug. 9, 1910.
2 SHEETS—SHEET 2.
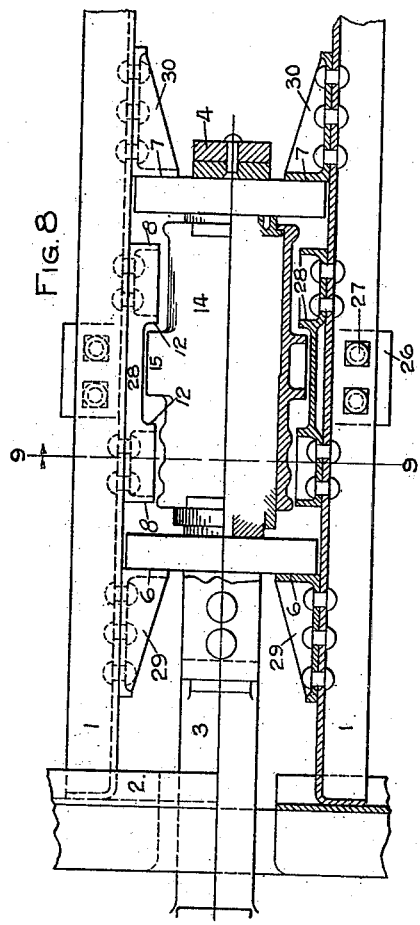
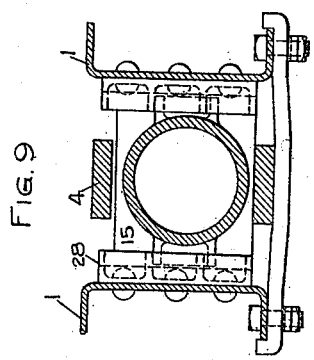
WITNESSES:
INVENTOR
William H. Miner.
BY
ATTORNEYS:

UNITED STATES PATENT OFFICE.

WILLIAM H. MINER, OF CHICAGO, ILLINOIS.

FRICTION DRAFT-RIGGING.

966,464.

Specification of Letters Patent.   Patented Aug. 9, 1910.

Application filed January 3, 1910.   Serial No. 536,113.

*To all whom it may concern:*

Be it known that I, WILLIAM H. MINER, a citizen of the United States, residing in Chicago, in the county of Cook and State of Illinois, have invented a new and useful Improvement in Friction Draft-Rigging, of which the following is a specification.

My invention relates to friction draft rigging for railway cars.

It consists, in connection with a draw-bar, draft yoke, spring, followers and stop members, and friction mechanism including a friction shell, friction shoes and wedge, in providing the friction shell with external stop projections or wings adapted to engage supplemental stops to limit the movement of the friction shell and aid in transmitting heavy blows or strains to the draft sills or car frame members to which the draft rigging is applied.

In the accompanying drawing forming a part of this specification, Figure 1 is a plan view, partly in horizontal section of a fricton draft rigging embodying my invention. Figs. 2, 3 and 4 are cross sections on lines 2—2, 3—3 and 4—4, respectively of Fig. 1. Fig. 5 is a detail side view of the wedge; Fig. 6 is a detail perspective view of one of the friction shoes; Fig. 7 is a detail perspective view of the friction shell; Fig. 8 is a detail plan view, partly in horizontal section, showing a modification and Fig. 9 is a cross section on line 9—9 of Fig. 8, the parts inside the friction shell being omitted.

In the drawing, 1 represents the draft sills or frame members of the car, 2 the front or end sill, 3 the draw-bar, 4 the draft yoke, 5 the stop members having front stops 6, rear stops 7 and limiting stops 8 and 9 for the followers 10, 11 to engage, and supplemental stops 12, 13 for engagement with the longitudinally movable friction shell 14 or its external stop projections or wings 15. The springs 16 and 17 react at one end against the friction shell 14, through the interposed preliminary compression follower or cap 18, and at the other end against the segmental friction shoes 19, which are preferably three in number and fit inside the friction shell and are expanded outwardly thereagainst by the pyramidal or three faced wedge 20 through the interposed anti-friction rollers 21.

The external stop projections or wings 15 on the friction shell are preferably formed integral therewith, and are preferably of a general rectangular shape, as will be understood from Fig. 7 of the drawing. The upright edges or faces 22 of the wings thus serve as guides, by engagement with the inner faces of the stop members. The friction shell 14 also has guide flanges or faces 24, 25 at its front and rear ends for engagement with the draft yoke.

26 is the tie plate secured by bolts 27 to the draft sills and upon which the draft yoke reciprocates and by which the draft rigging is supported in position between the draft sills.

In the modification shown in Figs. 8 and 9, the supplemental stops 12 of the friction shell are shown as being on separate piece stop members 28, and the front stops 6 are also on separate piece stop members 29 from the stop members 30, which have the rear stops 7.

I claim:—

1. In a friction draft rigging, the combination with a draw-bar, draft yoke, followers and stop members, having front, rear and limiting stops for engagement with the followers, and provided with supplemental stops, of a friction shell having external projections for engagement with said supplemental stops, a spring, and segmental friction shoes and wedge within said friction shell, substantially as specified.

2. In a friction draft rigging, the combination with a draw-bar, draft yoke, followers and front and rear stops engaging the followers, of a longitudinally movable friction shell, externally projecting wings on said shell at the middle portion thereof, supplemental stops for engagement with said wings in both pulling and buffing, friction shoes within said friction shell and a spring reacting at one end against said shell, and at the other end against said friction shoes, substantially as specified.

WILLIAM H. MINER.

Witnesses:
PEARL ABRAMS,
EDW. S. EVARTS.